United States Patent [19]

Nakao

[11] 4,441,129
[45] Apr. 3, 1984

[54] EJECT DEVICE OF MAGNETIC RECORDING TAPE DRIVING APPARATUS FOR TAPE CASSETTE

[75] Inventor: Toshihiro Nakao, Hachioji, Japan

[73] Assignee: Olympus Optical Co., Ltd., Tokyo, Japan

[21] Appl. No.: 309,079

[22] Filed: Oct. 6, 1981

[30] Foreign Application Priority Data

Oct. 16, 1980 [JP] Japan .......................... 55-147731[U]

[51] Int. Cl.³ .......................................... G11B 15/24
[52] U.S. Cl. .................................... 360/96.5; 360/71; 360/96.3
[58] Field of Search .................... 360/96.5, 96.6, 96.3, 360/71, 105, 137; 242/198, 201

[56] References Cited

U.S. PATENT DOCUMENTS

| | | | |
|---|---|---|---|
| 3,758,119 | 9/1973 | Harlan | 360/96.5 X |
| 3,867,722 | 2/1975 | Syohji | 242/198 X |
| 3,877,073 | 4/1975 | Takashino | 360/96.5 |
| 4,377,829 | 3/1983 | Kamimura et al. | 360/93 X |

*Primary Examiner*—John H. Wolff
*Attorney, Agent, or Firm*—Frishauf, Holtz, Goodman & Woodward

[57] ABSTRACT

An eject device used in a magnetic recording tape driving apparatus comprises a first moving member which is free to move between a first position and a second position;

a second moving member which is free to move between a first position and a second position, which prohibits a motor from rotating the reel shaft at the first position and which allows the motor to rotate the reel shaft at the second position;

a rotating member which is connected to the eject member at a position spaced part from the rotating center of the eject member, and which is free to move between a first position located within a path of movement between the first position and the second position of the first moving member and a second position located within a path of movement between the first position and the second position of said second moving member, the rotating member being located at the first position when the second moving member moves to the first position thereof, and being located at the second position when the second moving member moves to the second position thereof; and engaging projection which is mounted at the rotating member, which engages with the first moving member when the rotating member is located at the first position, so that the eject member moves from a first position to a second position thereof when the first moving member moves from the first position to the second position, and which disengages from the first moving member when the rotating member is located at the second position thereof.

16 Claims, 6 Drawing Figures

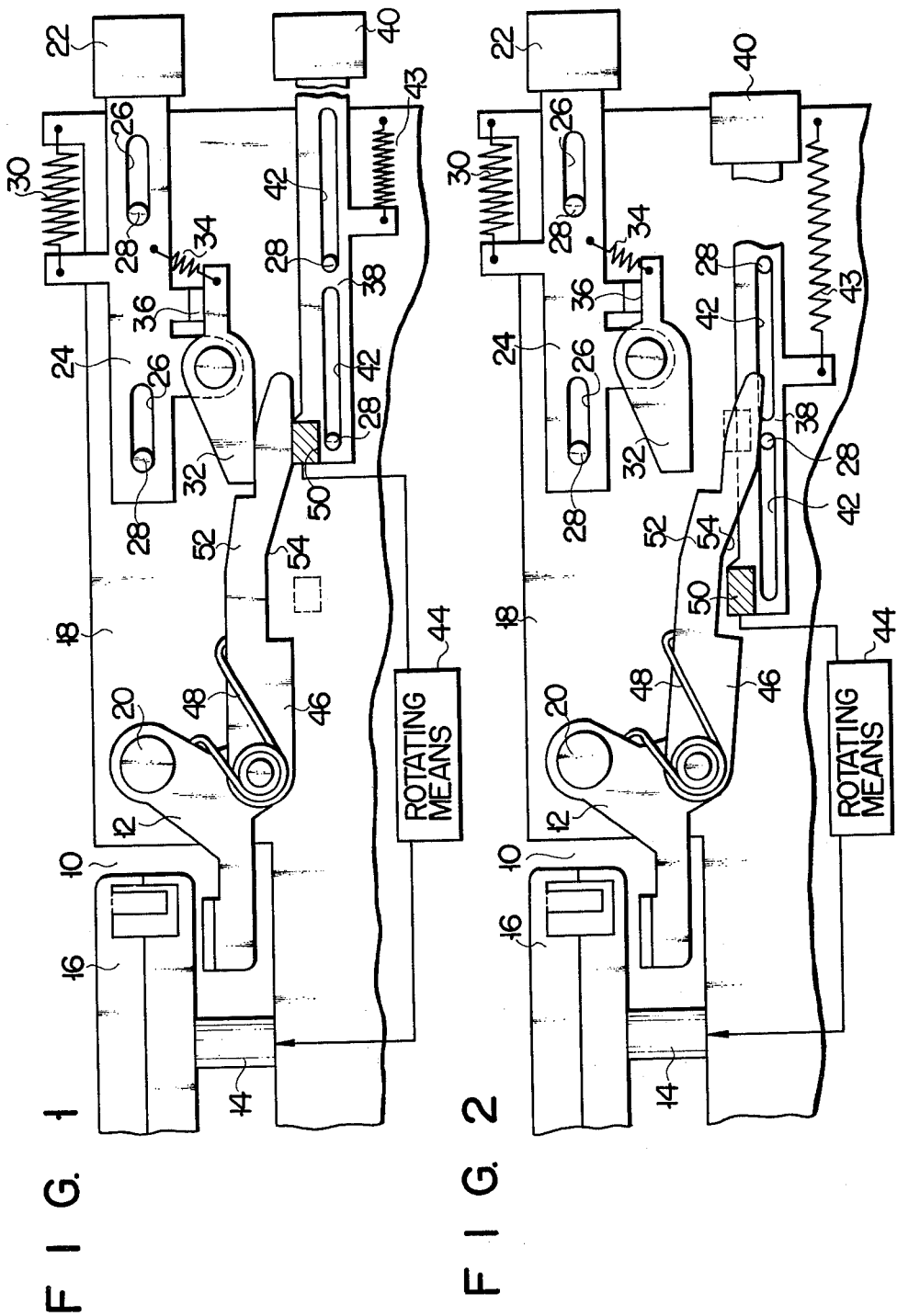

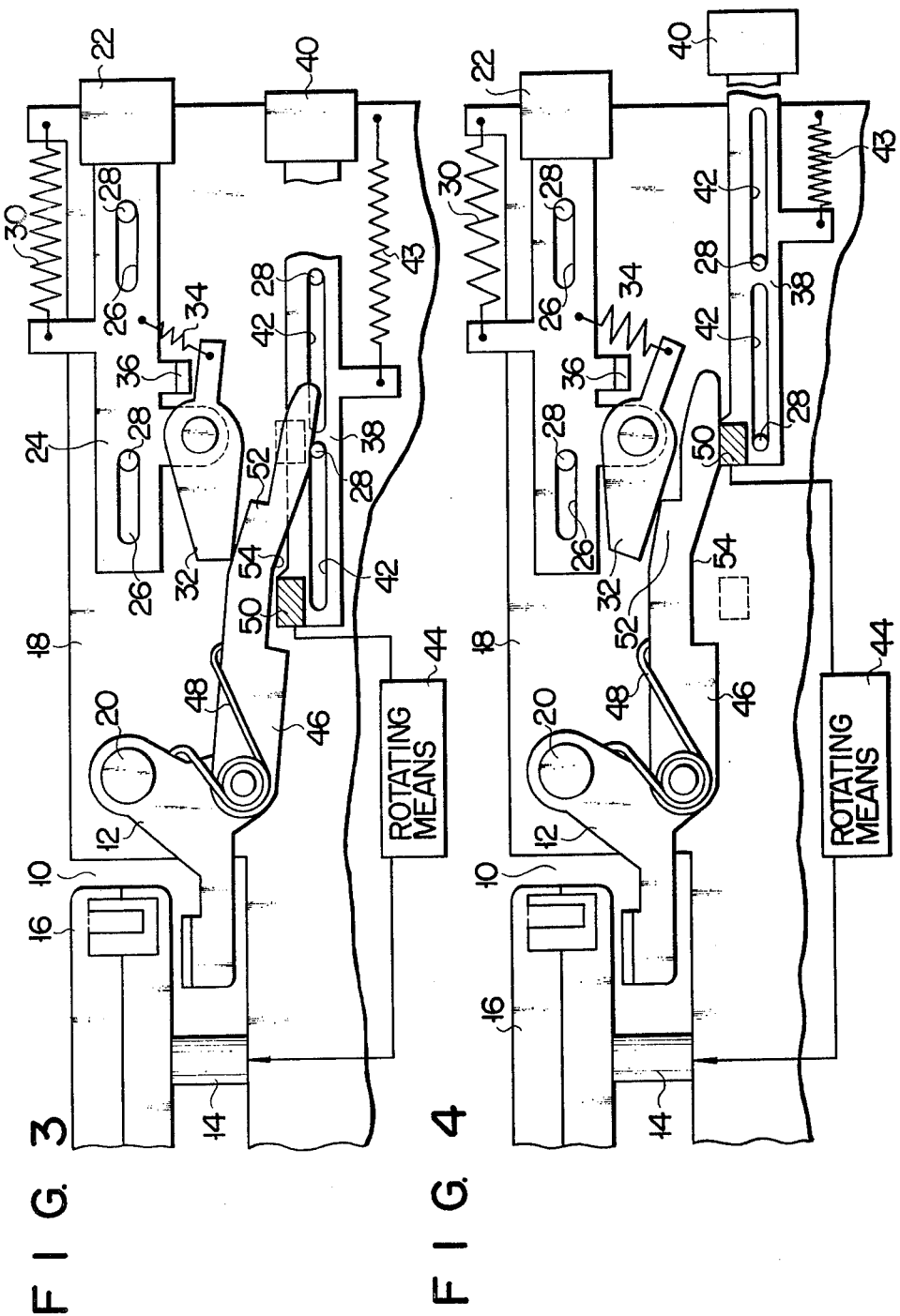

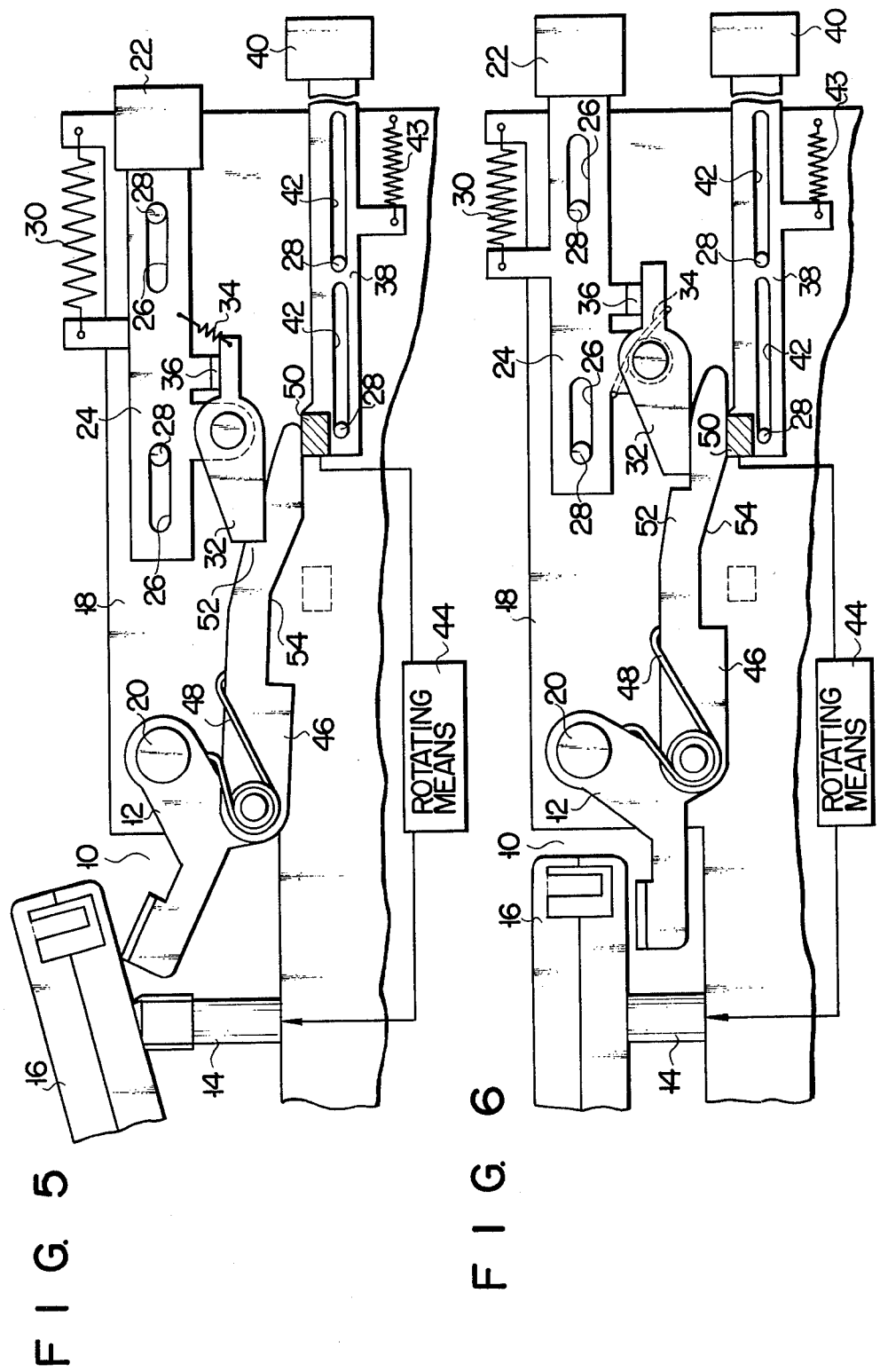

EJECT DEVICE OF MAGNETIC RECORDING TAPE DRIVING APPARATUS FOR TAPE CASSETTE

BACKGROUND OF THE INVENTION

The present invention relates to an eject device of a magnetic recording tape driving apparatus which uses a tape cassette.

A conventional magnetic recording tape driving apparatus for use with a tape cassette is provided with various control buttons which mostly have a plurality of component members mechanically ganged with each other. When a control button is depressed, the plurality of component members act to perform a function which the control button specifies.

In the magnetic recording tape driving apparatus of the type described above having mechanically operated control buttons, a control button for performing an eject function (to be referred to as the eject button hereinafter) is temporarily fixed by a fixing member while the magnetic recording tape travels. Therefore, erroneous ejection of the tape cassette mounted to the magnetic recording tape driving apparatus is prevented during tape travel.

Among the magnetic recording tape driving apparatus of the type which have mechanically operated control buttons, some apparatuses have an eject button which also functions as a control button for stopping the tape travel (to be referred to as the stop button hereinafter). With this eject/stop button, the stop function is always followed by the eject function; the eject function is not performed prior to the stop function in order to prevent erratic ejection. Therefore, in the magnetic recording tape driving apparatus for use with a tape cassette which has mechanically operated control buttons, as described above, the operation distance of a plurality of the component members of the respective control buttons is inevitably far apart, so a compact structure may hardly be accomplished. However, the component members are not easily damaged and trouble does not occur since the plurality of component members and the fixing members have sufficient mechanical strength so that predetermined functions are properly performed. The eject button can thus be temporarily fixed by the fixing member. Even if the eject button is depressed during travel of the magnetic recording tape, the eject button and the fixing member may not be damaged.

In order to manufacture a compact magnetic recording tape driving apparatus and minimize the force required to depress the control buttons, electrically operated control buttons (to be called touch-type control buttons) which require a short operation distance as compared with the distance for the mechanically operated control buttons and which require only a small force to be depressed have recently come into widespread use instead of the mechanically operated control buttons. However, when the electrically operated eject button is used, its various auxiliary components become complex and large. The mechanically operated eject button is, therefore, still used in most cases. In a magnetic recording tape driving apparatus for use with a tape cassette, in which all control buttons except the eject button are electrically operated, the mechanically constituted eject button and the electrically constituted stop button cannot be integrally arranged as an eject/-stop button. The eject button is, therefore, temporarily fixed by the fixing member. However, in a magnetic recording tape driving apparatus for use with a tape cassette, for example, an apparatus using a microcassette tape, the various component members and the fixing member of the eject button are smaller than those of the mechanical eject button of the conventional magnetic recording tape driving apparatus for use with a regular cassette tape; however, the mechanical strength of the compact various component members and the fixing member of the eject button are weaker than those of the conventional eject button. Therefore, although the compact magnetic recording tape driving apparatus for use with a tape cassette has an advantage in compactness, the eject button and the fixing member may be damaged when the eject button is erroneously depressed during tape travel.

SUMMARY OF THE INVENTION

The present invention provides an eject device of a magnetic recording tape driving apparatus for use with a tape cassette, having the advantage of compactness, in which component members are not damaged even if an eject button is erroneously depressed during travel of a magnetic recording tape.

BRIEF DESCRIPTION OF THE DRAWINGS

FIG. 1 is a front view schematically illustrating an arrangement of an eject device of an embodiment of the present invention, in which a first moving member connected to an eject button, a second moving member connected to a magnetic recording tape travelling mode setting button, a rotating member, a cassette eject level and an auxiliary moving member are located at a first position, and a tape cassette is mounted on reel shafts;

FIG. 2 is a front view illustrating the same arrangement as in FIG. 1, in which the second moving member is located at a second position;

FIG. 3 is a front view illustrating the same arrangement as in FIG. 1, in which the second moving member is located at the second position and then the first moving member is switched to the second position;

FIG. 4 is a front view illustrating the same arrangement as in FIG. 3, in which the second moving member of FIG. 3 is located at the first position; and FIG. 5 is a front view illustrating the same arrangement as in FIG. 1, in which the first moving member of FIG. 1 is located at the second position, and the cassette eject lever is located at the second position so that the mounting of the tape cassette on the reel shafts is released;

FIG. 6 is a front view schematically illustrating an arrangement of an eject device of another embodiment of the invention, in which a tortion coil spring is used as a biasing means for biasing an auxiliary moving member.

DETAILED DESCRIPTION OF THE PREFERRED EMBODIMENT

FIG. 1 is a view schematically illustrating a main section of a magnetic recording tape driving apparatus for use with a tape cassette, which has an eject device according to an embodiment of the present invention. Referring to FIG. 1, the magnetic recording tape driving apparatus for use with a tape cassette has a tape cassette mounting section 10. One end of a cassette eject lever 12 is disposed at the tape cassette mounting section 10, as shown in FIG. 1. The cassette eject lever 12 constitutes an eject member of the present invention. A reel shaft 14 extends from the tape cassette mounting section 10. A reel hub (not shown) of a tape cassette 16 is mounted on the reel shaft 14. One end of the cassette eject lever 12 is disposed below the tape cassette 16 which is mounted on the reel shaft 14 of the tape cassette mounting section 10. This end of the cassette eject lever 12 thus opposes the lower surface of the tape cassette 16.

The other end of the cassette eject lever 12, as shown in FIG. 1, is pivotally mounted to a chassis 18 housed in a housing (not shown) of the magnetic recording tape driving apparatus for use with a tape cassette. The position of the cassette eject lever 12 when one of the cassette eject lever 12 is located at a position shown in FIG. 1 is defined as a first position. The cassette eject lever 12 is rotatable about a rotating central shaft 20 near the other end thereof from the first position in the clockwise direction parallel to the plane of the figure. On the chassis 18, one end of a first movable member 24 (hereinafter "moving" member 24) is connected to an eject button 22. The eject button 22 extends from the housing (not shown) to the outside.

Elongate holes 26 are formed at the first moving member 24 in the longitudinal direction as shown in FIG. 1. Pins 28 which are mounted on the chassis 18 extend through the elongate holes 26. The pins 28 of the first moving member 24 are guided through the holes 26 so that the first moving member 24 is free to move in the longitudinal direction parallel to the plane of the figure, as shown in FIG. 1.

One end of a first biasing means 30 is connected to the first moving member 24 and the other end thereof is connected to the chassis 18, as shown in FIG. 1. In this embodiment, the first biasing means 30 is constituted by a coil spring which constantly biases the eject button 22 and the first moving member 24 to the right end as shown in FIG. 1. The position of the first moving member 24 when the eject button 22 is located at the right end position as shown in FIG. 1 is defined a first position of the first moving member 24. The position of the moving member 24 when the eject button 22 is pressed to the left end position against the biasing force of the first biasing means 30 is defined as a second position of the first moving member 24. FIGS. 3, 4 and 5 show the condition in which the first moving member 24 is located at the second position.

Referring to FIG. 1, the first moving member 24 has an auxiliary moving member 32 which is free to rotate and the middle segment of which is connected to the first moving member 24. The auxiliary moving member 32 is rotatable parallel to the plane of the figure. One end of a biasing means 34 is, as shown in FIG. 1, connected to one end of the auxiliary moving member 32 and the other end of the biasing means 34 is connected to the first moving member 24. In this embodiment, the biasing means 34 is constituted by a coil spring which biases the auxiliary moving member 24 in the counterclockwise direction. The right upper edge of the auxiliary moving member 32 biased by the biasing means 34 is in contact with a stopper 36 formed at the first moving member 24, as shown in FIG. 1. Therefore, the auxiliary moving member 32 is constantly in contact with the stopper 36 by the biasing force of the biasing means 34, as shown in FIG. 1. The position of the auxiliary moving member 32 at this moment is defined as a first position of the auxiliary moving member 32.

A second movable member 38 (hereinafter "moving" member 38) is disposed within the housing (not shown) of the magnetic recording tape driving apparatus for use with a tape cassette, as shown in FIG. 1. Magnetic recording tape travelling mode setting buttons 40 are mechanically connected to the second moving member 38 and the magnetic recording tape travelling mode setting buttons 40 extend from the housing (not shown) to the outside.

Elongate holes 42 are formed at the second moving member 38, extending in the longitudinal direction, as shown in FIG. 1. The pins 28 which are mounted to the chassis 18 extend through the elongate holes 42. The second moving member 38 is guided by the elongate holes 42 to freely move in the longitudinal direction parallel to the plane of the figure.

One end of a second biasing means 43 is connected to the second moving member 38 and the other end thereof is connected to the chassis 18, as shown in FIG. 1. In this embodiment, the second biasing means 43 is constituted by a coil spring which biases the second moving member 38 to the right end position in FIG. 1. As shown in FIG. 1, the position of the second moving member 38 when the second moving member 38 is located at the right end position is defined as a first position of the second moving member 38. When a magnetic recording tape travelling mode setting button 40 is depressed, the second moving member 38 is biased to the left end position against the biasing force of the second biasing means 43. The position of the second moving member 38 at this moment is defined as a second position of the second moving member 38. The second moving member 38 located at the second position is shown in FIGS. 2 and 3.

The second moving member 38 is connected to a known rotating means 44 having an electric switch and a motor (not shown). The motor (not shown) of the rotating means 44 is connected to the reel shaft 14. The electric switch (not shown) is turned off to cut off the power supply from a power source (not shown) to the motor when the second moving member 38 is located at the first position, so that the motor and the reel shaft 14 stop rotating. The electric switch (not shown) is turned on to supply power from the power source to the motor (not shown) when the second moving member 38 is located at the second position, so that the motor and the reel shaft 14 start rotating and the magnetic recording tape travels.

The magnetic recording tape travelling mode setting buttons described above include play, rewind, and fast forward buttons.

In this embodiment, one end of a rotating member 46 is rotatably connected by, for example, a pin, at a position apart from the rotating central shaft 20 and between both ends of the cassette eject lever 12. The rotating member 46 is rotatable about one end thereof, parallel to the plane of the figure. The other end of the rotating member 46, as shown in FIG. 1, is located at a position between the first moving member 24 at the first position and the second moving member 38 at the first position.

A biasing means 48 is connected to the rotating member 46 and the cassette eject lever 12, as shown in FIG. 1. In this embodiment, the biasing means 48 is constituted by a torsion spring which is mounted coaxially with the rotating center of the rotating member 46. One end of the torsion spring is anchored to the cassette eject lever 12 and the other end thereof is anchored to the rotating member 46. The biasing means 48 biases the rotating member 46 in the clockwise direction in FIG. 1. Therefore, when the second moving member 38 is located at the first position, the lower edge of the other end of the rotating member 46 is in contact with the upper edge of a projection 50 of the second moving member 38. The position of the rotating member 46 at this moment is defined as a first position of the rotating member 46. An engaging means 52 is disposed at the upper edge of the other end of the rotating member 46, as shown in FIG. 1. In this embodiment, the engaging means 52 is constituted by a projection extending upward and formed at the upper edge of the other end of the rotating member 46. When the rotating member 46 is located at the first position, the engaging means 52 of the rotating member 46 is located within the path of movement of the first moving member 24 which is free to move between the first and second positions. For example, in this embodiment, the engaging means 52 is located within the path of movement of the auxiliary member 32 which moves with the first moving member 24 initially located at the first position.

A recess 54 is formed at the lower edge of the rotating member 46, as shown in FIG. 1. When the second moving member 38 is located at the second position, as shown in FIG. 2, the projection 50 of the second moving member 38 is disposed within the recess 54 of the rotating member 46. As a result, the rotating member 46 is rotated from the first position shown in FIG. 1 in the clockwise direction by the biasing force of the biasing means 48.

When the rotating member 46 is rotated from the first position in the clockwise direction, the rotating member 46 moves the engaging means 52 from the path of movement of the first moving member 24, that is, it separates the engaging means 52 from the auxiliary moving member 32, as shown in FIG. 2. The position of the rotating member 46 at this momemt is defined as a second position of the rotating member 46.

The lower edge defining the recess 54 of the other end of the rotating member 46, at the second position, is partially located along the path of movement of the projection 50 of the second moving member 38 moving between the first and second positions, as shown in FIG. 2.

The mode of operation of one embodiment of the unit arranged in the manner described above will be described below.

Assume that a reel hub (not shown) of the tape cassette 16, as shown in FIG. 1, is mounted over the reel shaft 14 of the tape cassette mounting section 10. When one of the magnetic recording tape travelling mode setting buttons 40, that is, the play, rewind, or fast forward button is depressed at the magnetic recording tape driving apparatus, a magnetic recording tape (not shown) of the tape cassette 16 travels and the second moving member 38 is moved to the second position against the biasing force of the second biasing means 43, as shown in FIG. 2. The second moving member 38 is then held at the second position by a known holding means (not shown). At the same time, the rotating member 46 is moved to the second position, as shown in FIG. 2, by the biasing force of the biasing means 48. When the eject button 22 is then depressed, the first moving member 24 is moved to the second position against the biasing force of the first biasing means 30, as shown in FIG. 3.

However, the engaging means 52 of the rotating member 46 located at the second position is separated from the path of movement of the auxiliary moving member 32 of the first moving member 24 which moves from the first position to the second position. Therefore, the auxiliary moving member 32 of the first moving member 24 which moves from the first position to the second position does not engage with the engaging means 52 of the rotating member 46 which is located at the second position as shown in FIG. 3. The cassette eject lever 12 is held at the first position, and does not come in contact with the lower surface of the housing of the tape cassette 16 where the magnetic recording tape (not shown) travels.

Since the auxiliary moving member 32 does not engage with the engaging means 52 of the rotating member 46, the engaging means 52 of the rotating member 46 does not strongly act on the auxiliary moving member 32 and the first moving member 24. In an arrangement in which the eject button 22 is fixed at the first moving member 24 and the magnetic recording tape travelling mode setting buttons 40 are mechanicaly connected to the second moving member 38, if the components are made small for accomplishing a compact magnetic recording tape driving apparatus, which usually results in reduction in mechanical strength, the first moving member 24, the second moving member 38 and the rotating member 46 are not damaged.

When the selected one of the magnetic recording tape travelling mode setting buttons 40 of the second moving member 38 which is held at the second position by the known holding means (not shown) is further depressed, that is, when the play, rewind, or fast forward button is further depressed, the second moving member 38 is released from the second position. The second moving member 38 moves from the second position in FIG. 2 to the first position in FIG. 1 by the biasing force of the second biasing means 43. While the second moving member 38 moves from the second position to the first position, the projection 50 of the second moving member 38 is brought into slidable contact with the lower edge defining the recess 54 of the other end of the rotating member 46 located at the second position. The rotating member 46 which is in slidable contact with the projection 50 rotates in the counterclockwise direction from the second position and returns to the first position as shown in FIG. 1. Meanwhile, the cassette eject lever 12 is held at the first position.

When the second moving member 38 returns from the second position to the first position and when the first moving member 24 moves to the second position against the biasing force of the first biasing means 30, the engaging means 52 of the rotating member 46 which returns from the second position to the first position comes in contact with the lower edge of the left end of the auxiliary moving member 32 of the first moving member 24. The auxiliary member 32 rotates in the clockwise direction from the first position against the biasing force of the biasing means 34 as shown in FIG. 4. When the auxiliary moving member 32 thus rotates, the rotating member 46 returns to the first position as shown in FIG. 4. By the force imposed on the rotating member 46 by the projection 50 of the second moving member 38, the auxiliary moving member 32 does not strongly act on the second moving member 38 and the rotating member 46 since the auxiliary moving member 32 rotates. Therefore, in the arrangement in which the eject button 22 is fixed at the first moving member 24 and the magnetic recording tape travelling mode setting switches 40 are mechanically connected to the second moving member 38, if the components are made small for accomplishing a compact magnetic recording tape driving apparatus, which usually results in a reduction in mechanical strength, the first moving member 24, the second moving member 38 and the rotating member 46 are not damaged.

When the second moving member 38 is located at the first position, as shown in FIG. 5, the magnetic recording tape (not shown) of the tape cassette 16, the reel hub of which is mounted over the reel shaft 14, stop travelling. When the eject button 22 is depressed at this moment, the first moving member 24 moves from the first position to the second position against the biasing force of the first biasing means 30 as shown in FIG. 5. The lower edge of the left end of the auxiliary moving member 32 of the first moving member 24 which moves from the first position to the second position comes in contact with the engaging means 52 of the rotating member 46 which is disposed at the first position. The lower edge of the right end of the rotating member 46 which is in slidable contact with the auxiliary member 32 moves on the upper surface of the projection 50, of the second moving member 38 of the other or right end in the direction in which the first moving member 24 moves from the first position to the second position along the chassis 18. The cassette eject lever 12 rotates in the clockwise direction from the first position, as shown in FIG. 5, by the leftward movement of the rotating member 46. The left end of the cassette eject lever 12 comes in contact with the lower surface of the housing of the tape cassette 16, the reel hub (not shown) of which is mounted to the reel shaft 14. The tape cassette 16 which is in contact with the rotating member 46 moves upward along the reel shaft 14 as shown in FIG. 5. The tape cassette 16 is thus released so that the reel hub (not shown) is removed from the reel shaft 14. The position of the cassette eject lever 12 at this moment is defined as a second position of the cassette eject lever 12.

When the force imposed on the eject button 22 is removed, the first moving member 24 returns to the first position by the biasing force of the first biasing means 30. Simultaneously, the cassette eject lever 12 returns to the first position as shown in FIG. 1 by the biasing force of the biasing means 48. When the cassette eject lever 12 thus moves from the second position to the first position, the lower edge of the other or right end of the rotating member 46 slides along the upper surface of the projection 50 of the second moving member 38 in the direction in which the first moving member 24 moves from the second position to the first position along the chassis 18. The rotating member 46 thus returns to the position as shown in FIG. 1.

An eject device of a magnetic recording tape driving apparatus according to the present invention comprises: a first moving member which is free to move between a first position and a second position; a second moving member which is free to move between a first position and a second position, which prohibits rotating means from rotating a reel shaft at the first position and which allows said rotating means to rotate said reel shaft at the second position; a rotating member which is connected to an eject member at a position spaced part from the rotating center of said eject member, and which is free to move between a first position located within a path of movement between the first position and the second position of said first moving member and a second position located within a path of movement between the first position and the second position of said second moving member, said rotating member being located at the first position when said second moving member moves to the first position thereof, and being located at the second position when said second moving member moves to the second position thereof; and engaging means which is mounted at said rotating member, which engages with said first moving member when said rotating member is located at the first position, so that said eject member moves from a first position to a second position thereof when said first moving member moves from the first position to the second position, and which disengages from said first moving member when said rotating member is located at the second position thereof.

With such a construction, in a magnetic recording tape driving apparatus for use with a tape cassette having an advantage of compactness, even if the eject button is erroneously depressed during tape travel, the component members are not damaged.

In an eject device of a magnetic recording tape driving apparatus for use with a tape cassette according to the present invention, a biasing means for biasing the eject member at the first position thereof is preferably provided.

With the structure described above, the eject member is constantly biased at the first position thereof without acting in the direction of gravity.

In the eject device of the magnetic recording tape driving apparatus for use with a tape cassette according to the present invention, the rotating member is preferably provided with a biasing means for biasing the rotating member at the second position thereof.

Therefore, the eject device is properly operated without acting in the direction of gravity.

In the eject device of the magnetic recording tape driving apparatus for use with a tape cassette according to the present invention, the plane to which the path of movement of the eject member belongs, the plane to which the path of movement of the first moving member belongs, the plane to which the path of movement of the second moving member belongs, and the plane to which the path of movement of the rotating member belongs are preferably substantially parallel to each other.

With an arrangement as described above, the eject device of the present invention has a simple structure and the space which is required for movement of the component members is made small.

In the eject device of the magnetic recording tape driving apparatus for use with a tape cassette according to the present invention, the plane to which the path of movement of the eject member belongs, the plane to which the path of movement of the first moving member belongs, the plane to which the path of movement of the second moving member belongs, and the plane to which the path of movement of the rotating member belongs are preferably substantially parallel to each other.

With such an arrangement, the eject device according to the present invention is made simple and the space which is required for movement of the component members is made small.

In the eject device of the magnetic recording tape driving apparatus for use with a tape cassette according to the present invention, the rotating member preferably has a torsion spring which is coaxially mounted with the rotating center of the rotating member relative to the eject member, which biases the eject member to the first position thereof, and which biases the rotating member at the second position thereof.

Therefore, the arrangement of the biasing means for biasing the eject member at the first position thereof and the biasing means for biasing the rotating member at the second position of the rotating member may be made simple and compact.

In the eject device of the magnetic recording tape driving apparatus for use with a tape cassette according to the present invention, the first moving member is preferably provided with an auxiliary moving member which is free to move between the first position and the second position. While the first moving member moves from the first position to the second position, the auxiliary moving member engages with the engaging member of the rotating member when the rotating member is located at the first position. When the rotating member is located at the second position and while the first moving member is moved from the first position to the second position, the auxiliary moving member moves to the second position in which the auxiliary moving member does not engage with the engaging member of the rotating member. The auxiliary moving member further moves to the second position in which the auxiliary moving member does not engage with the engaging means of the rotating member when the rotating member and the first moving member are respectively located at the second positions and the rotating member is moved from the second position to the first position.

With the arrangement described above, even if the eject button is depressed during tape travel, the component members of the eject button and the magnetic recording tape travelling mode setting buttons are not damaged.

In the eject device of the magnetic recording tape driving apparatus for use with a tape cassette according to the present invention, the auxiliary moving member is preferably provided with a biasing means for biasing the auxiliary moving member to the first position.

With the arrangement described above, the eject device consistently operates properly regardless of the relative direction of gravity.

In the eject device of the magnetic recording tape driving apparatus for use with a tape cassette according to the present invention, the biasing means of the auxiliary moving member may be preferably a torsion spring which is coaxially mounted with the rotating center of the auxiliary moving member relative to the first moving member.

With such an arrangement, the biasing means may be made simple and compact.

The embodiment described above is merely illustrative of the present invention. Therefore, the particular embodiment described above does not limit the present invention. Various changes and modifications may be made within the scope and spirit of the present invention.

For example, the various biasing means 30, 34, 43, and 48 may be constituted by an elastic member such as rubber, or by a coil spring.

What is claimed is:

1. An eject device used in a magnetic recording tape driving apparatus having a reel shaft on which a tape cassette is mounted, rotating means for rotating the reel shaft, and an eject member which is free to rotate about a rotating center between a first position in which the eject member is spaced apart from the tape cassette mounted on the reel shaft and a second position in which the eject member comes in contact with the tape cassette to disengage the tape cassette from the reel shaft, said eject device comprising:

a first movable member which is free to move between a first position and a second position;
   a second movable member which is free to move between a first position and a second position, said second movable member prohibiting said rotating means from rotating said reel shaft at the first position of said second movable member, and said second movable member permitting said rotating means to rotate said reel shaft at the second position of said second movable member;
   a rotating member which is connected to the eject member at a position spaced apart from said rotating center of said eject member, said rotating member being free to move between a first position located within a path of movement between said first position and said second position of said first movable member and a second position located within a path of movement between said first position and said second position of said second movable member, said rotating member being located at said first position thereof when said second movable member moves to said first position thereof, and said rotating member being located at said second position thereof when said second movable member moves to said second position thereof; and
   engaging means coupled to said rotating member, and which engages with said first movable member when said rotating member is located at said first position thereof, so that said eject member moved from a first position to a second position thereof when said first movable member moves from said first position to said second position thereof, and said engaging means disengaging from said first movable member when said rotating member is located at said second position thereof.

2. An eject device according to claim 1, further comprising biasing means for biasing said eject member to said first position thereof.

3. An eject device according to claim 1, wherein said rotating member includes biasing means for biasing said rotating member to said second position thereof.

4. An eject device according to any one of claims 1, 2 or 3, wherein each one of said eject member, first moving member, second moving member and rotating member is formed from a plate-like material; each one of said eject member, first moving member, second moving member and rotating member moves in a plane to which its respective plane surface belongs; and said plane to which the plane surface of said eject member belongs, said plane to which the plane surface of said first moving member belongs, said plane to which the plane surface of said second moving member belongs and said plane to which the plane surface of said rotating member belongs are all substantially parallel with each other.

5. An eject device according to claim 4, wherein said rotating member comprises spring means which is coaxial with a rotating center of said rotating member relative to said eject member and which biases said eject member to the first position and said rotating member to the second position.

6. An eject device according to claim 1, wherein said first moving member is preferably provided with an auxiliary moving member which is free to move between the first position and the second position; said auxiliary moving member engaging with said engaging means of said rotating member when said rotating member is located at the first position and while said first moving member moves from the first position to the second position, said auxiliary moving member moving to the second position in which said auxiliary moving member does not engage with said engaging means of said rotating member when said rotating member is located at the second position and while said first moving member is moved from the first position to the second position, and said auxiliary moving member also moving to the second position in which said auxiliary moving member is disengaged from said engaging means of said rotating member when said rotating member and said first moving member are respectively located at the second positions and while said rotating member is moved from the second position to the first position.

7. An eject device according to claim 6, further comprising biasing means for biasing said eject member to the first position.

8. An eject device according to claim 6, wherein said rotating member is provided with biasing means for biasing said rotating means to the second position.

9. An eject device according to claim 6, wherein said auxiliary moving member is provided with biasing means for biasing said auxiliary moving member to the first position.

10. An eject device according to any one of claims 6, 7, 8 or 9, wherein each one of said eject member, first moving member, second moving member and rotating member is formed from a plate-like material; each one of said eject member, first moving member, second moving member and rotating member moves in a plane to which its respective plane surface belongs; and said plane to which the plane surface of said eject member belongs, said plane to which the plane surface of said first moving member belongs, said plane to which the plane surface of said second moving member belongs and said plane to which the plane surface of said rotating member belongs are all substantially parallel with each other.

11. An eject device according to claim 9, wherein said auxiliary moving member is rotatably mounted at said first moving member and is rotatably movable between the first position and the second position of said first moving member; a plane to which a path of movement of said eject member belongs, a plane to which a path of movement of said first moving member belongs, a plane to which a path of movement of said second moving member belongs, and a plane to which a path of movement of said rotating member belongs are substantially parallel.

12. An eject device according to claim 11, wherein said biasing means of said auxiliary moving member comprises a spring means which is coaxial with the rotating center of said auxiliary moving member relative to said first moving member.

13. An eject device according to claim 6, wherein each one of said eject member, first moving member, second moving member and rotating member is formed from a plate-like material; each one of said eject member, first moving member, second moving member and rotating member moves in a plane to which its respective plane surface belongs; and said plane to which the plane surface of said eject member belongs, said plane to which the plane surface of said first moving member belongs, said plane to which the plane surface of said second moving member belongs and said plane to which the plane surface of said rotating member belongs are all substantially parallel with each other.

14. An eject device according to claim 12, wherein said rotating member comprises a spring means which is coaxial with the rotating center of said rotating member relative to said eject member and which biases said eject member to the first position and said rotating member to the second position.

15. An eject device according to claim 14, wherein said auxiliary moving member is rotatably mounted at said first moving member and is rotatably movable between the first position and the second position; a plane to which a path of movement of said eject member belongs, a plane to which a path of movement of said first moving member belongs, a plane to which a path of movement of said second moving member belongs, and a plane to which a path of movement said rotating member belongs are substantially parallel.

16. An eject device according to claim 15, wherein said biasing means of said auxiliary moving means comprises a spring means which is coaxial with the rotating center of said auxiliary moving member relative to said first moving member.

* * * * *